G. O. CURME, Jr.
PROCESS OF TREATING GASEOUS MIXTURES.
APPLICATION FILED MAY 4, 1920.
1,422,183.                                          Patented July 11, 1922.
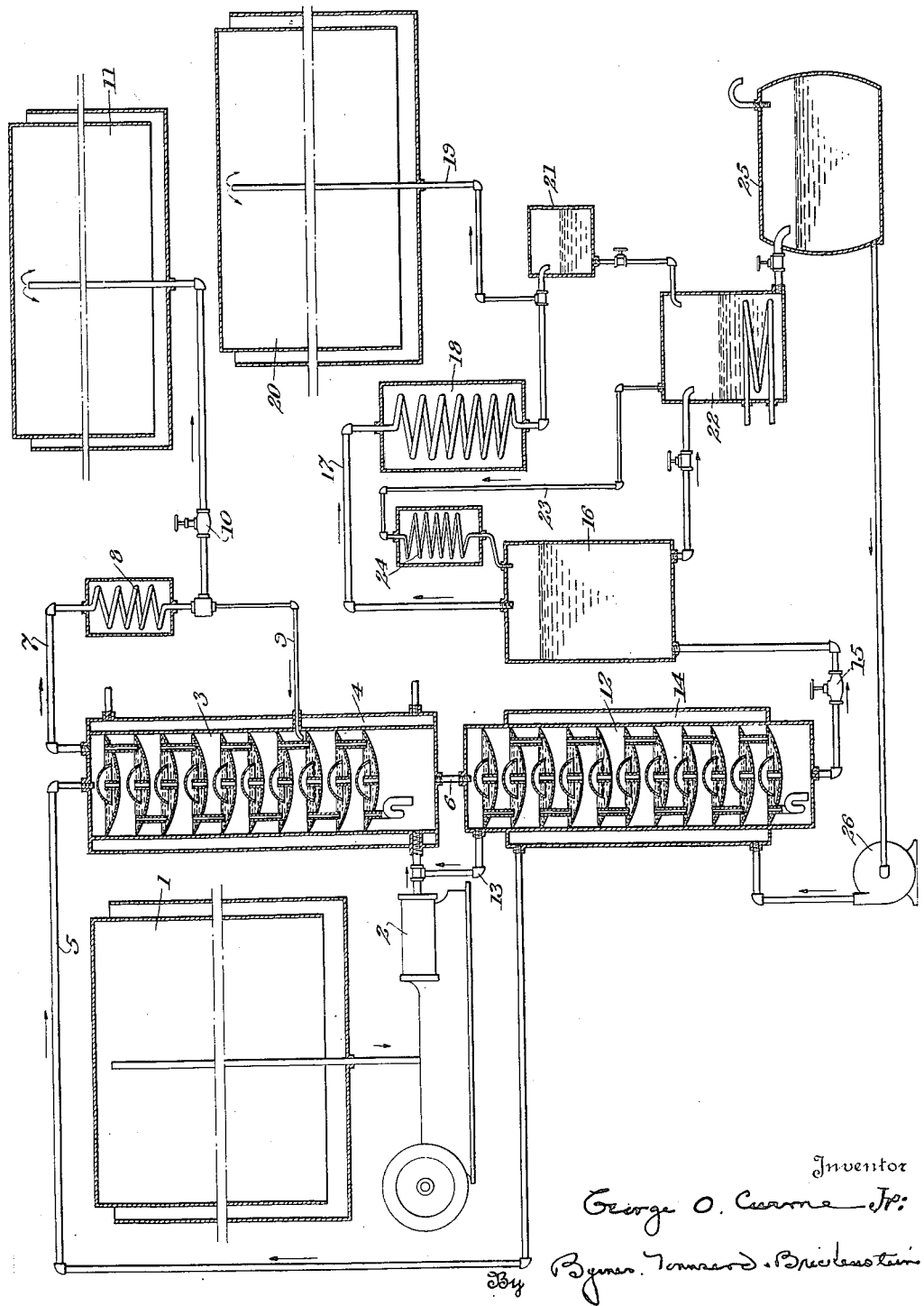
Inventor
George O. Curme Jr.
By Byrnes, Townsend & Breckenstein
Attorneys

UNITED STATES PATENT OFFICE.

GEORGE O. CURME, JR., OF PITTSBURGH, PENNSYLVANIA, ASSIGNOR TO UNION CARBIDE COMPANY, OF NEW YORK, N. Y., A CORPORATION OF VIRGINIA.

PROCESS OF TREATING GASEOUS MIXTURES.

1,422,183.  Specification of Letters Patent.  Patented July 11, 1922.

Application filed May 4, 1920. Serial No. 378,782.

*To all whom it may concern:*

Be it known that I, GEORGE O. CURME, Jr., a citizen of the United States, residing at Pittsburgh, in the county of Allegheny and State of Pennsylvania, have invented certain new and useful Improvements in Processes of Treating Gaseous Mixtures, of which the following is a specification.

This invention is a process applicable to the treatment of any gaseous mixture from which it is desired to isolate any single component, whether comprising an individual gas or a group of individuals, and to obtain the same in a condition of substantial purity as regards contamination by other components of the mixture. The present process will accomplish the results now commonly accomplished by the well-known gas-liquefaction and rectification processes, but employs a novel procedure, differing essentially from the said known gas liquefaction processes; which novel procedure is in most cases at least much more economical of operation, and which may be employed under conditions where the gas liquefaction processes cannot be employed at all by reason of the presence in the mixture of relatively high melting (or readily solidifying) components, such as carbon dioxid, acetylene, etc.

According to the present invention, I accomplish this result by utilizing in a special way the known solvent power of liquids for gases, the differences in the solvent power of various liquids for various gases, and the wide variation of this solvent power of a definite liquid for a definite gas under changes in temperature. Also the changes in solvent power of a definite liquid for a definite gas with changes of pressure according to the law of Henry, are utilized in this process.

Although I will describe my process with particular reference to the recovery of ethane from natural gas, and to the recovery of acetylene from gas mixtures containing the same, I desire it to be understood that in its broad aspects it is directly applicable to the separation, and recovery in substantially pure form, of the more soluble component or components of any gas mixture; and that it is of quite as general applicability as are the present known gas liquefaction and rectification processes. Among the valuable gases which may be profitably recovered by this method from gas mixtures in which they commonly occur may be mentioned: ethylene from coke oven gas; ethylene from the gas mixtures produced in the various oil cracking processes, and oil shale distillation processes; sulfur dioxid from the gaseous products of combustion of sulfur or sulfid ores; carbon dioxid from the gaseous products of combustion of carbonaceous matter; chlorin from the oxidation of gaseous hydrochloric acid; hydrochloric acid from the chlorination of organic compounds, etc. It is understood that in all of the various cases different solvents may be used, said solvents being capable of existing in liquid phase at the operating temperature, and having a lower degree of volatility than the liquid phase of the gas to be isolated; also that different conditions of temperature and pressure may be chosen, and different forms of apparatus may be used to suit the characteristics of the particular gas mixture treated. These points are not essential to the basic principles on which the invention is founded, and are only incidental to its proper and most economical operation.

The process of dissolving a gas in a liquid and subsequently liberating it therefrom for the purpose of purifying it, and separating it from less soluble impurities, is an old and frequently used operation. It is known, however, that such a procedure never gives a perfectly pure product, or at least it does so only in exceptional cases, for all gases have a certain solubility, however small, in all liquids; and consequently the gas liberated from the solvent in the well-known process of simple solution and evolution necessarily contains some of the less soluble components. It is clearly to be understood that the present invention is entirely distinct from such processes in that it involves the novel principle of rectification of the soluble gas in the presence of the dissolving liquid, preferably at a temperature above and a pressure below that of the liquefaction conditions of said gas; and that by application of this principle in one or more operating stages as may be required, it is possible to isolate a gas in a pure state from a gaseous mixture, even though the contaminating or associated gases are of an approximately equal order of solubility in the solvent used.

For a full understanding of the invention

I will describe it in an illustrative embodiment according to which ethane is separated and recovered from a gas mixture such as natural gas, or concentrate therefrom, reference being made to the accompanying drawing in which the figure is a diagrammatic representation of one system for use in carrying out my invention.

In case other gases, such as propane, butane, pentane, etc. are also present in the natural gas, as is sometimes the case; and if these gases are as soluble as, or more soluble than ethane in the particular solvent chosen, it is understood that they will accompany the ethane in its initial removal from the fixed gases, methane, nitrogen, helium, etc., which constitute the main body of the natural gas. In this respect therefore, the present process resembles the known gas liquefaction and rectification processes in which also any more readily liquefiable components accompany in the first instance the particular component to the isolation of which the operation is primarily directed. However, by a repetition or repetitions of the present process the ethane, propane, etc. may each be isolated in any desired degree of purity.

In the said drawing 1 represents a holder for the crude gas from any suitable source of supply, such as a pipe line or gas well; 2 is a gas compressor, and 3 an absorption column which is preferably provided with cooling or refrigerating means indicated as the jacket 4. The column is illustrated as of the common plate and bell type; the solvent, which in this case may be common kerosene, or a definite fraction therefrom, or other solvent liquid of the hydrocarbon type which will retain its fluidity at the operating temperatures, being introduced at the top through pipe 5, flowing downwardly through the system in contact with the countercurrent of gas, and being discharged at the bottom through pipe 6. The gaseous mixture is delivered by the compressor 2 at the bottom of the column and flows upwardly therethrough, the soluble constituents being condensed or dissolved, or condensed and dissolved, in the solvent liquid according to their physical characteristics: thence the residual gases, freed from ethane, flow through pipe 7 and a reducing valve 10 to the gas holder 11. In case the solvent possesses an appreciable vapor tension at the operating temperature of the absorption tower, a condenser 8 and return-flow conduit 9 may be interposed in the gas-outlet system.

In order to increase the solubility of the gas in the liquid flowing through the column 3 the latter is maintained at a temperature considerably below room temperature, and preferably of the order of $-50°$ C. For the same purpose a substantial superatmospheric pressure is maintained within the column, amounting preferably to several atmospheres, or even up to a hundred atmospheres or more in the case of gases of extremely low solubility. Under these conditions of low temperature and high pressure the more soluble gas, or gases, typified in this case by ethane, are quickly absorbed; and by a proper adjustment between the volumes and rates of flow of the solvent and of the gas, an effluent gas or gas mixture wholly free from ethane is readily obtained.

It will be understood that under such operating conditions as are herein contemplated, the solubility in the solvent liquid of the component to be isolated may be definitely adjusted to any desired value whatever, ranging from the very limited solubility of the gas in the liquid at ordinary temperatures and pressures, to the (infinite) solubility of the components in liquid phase in the solvent, also in liquid phase at the operating temperature. It should of course be understood that the solvent chosen should be one which is miscible with the liquefied gas. Preferably the solvent should have a low and practically negligible vapor tension, at least under the operating conditions obtaining in the absorption portion of the system. It is not essential in every application of the invention that the system should be maintained under sub-atmospheric temperature: for example in the case of sulfur dioxid the solvent employed may be water, and the absorption tower may operate at normal temperatures, or at any temperature above the freezing point, the purifying column being heated to a higher temperature in order to secure the rectifying effect as above described. As a rule, however, the operation is most efficiently and economically carried out at sub-atmospheric temperatures and at super-atmospheric pressures.

The kerosene or other solvent flowing from column 3 is heavily charged with ethane, together with smaller amounts of the less soluble gaseous components of the natural gas, which will hereinafter be termed methane for convenience, although it is understood that the methane may be accompanied by some nitrogen, helium, etc. This solution flows directly to a purifying column 12 which may have the same general construction as the absorbing column 3. The purifying column 12 preferably has free gas connection with the absorbing column 3 through the conduit 13, so that the superatmospheric pressure is uniform throughout this part of the system. The temperature of the solvent progressively rises, however, in its downward passage through the tower 12, owing to the absorption of heat from the atmosphere; or preferably from the fresh solvent, which may be caused in its passage to the absorption column to traverse in countercurrent stream the jacket 14 surrounding the purifying column. In this way also a certain economy is effected by a heat interchange between the inflowing and outflowing portions of the solvent liquid.

In the purifying column the gases tend to escape by bubbling out from the solvent in proportion as the temperature of the latter rises, this temperature rise tending to diminish its solvent power for the gas. Since ethane, as the most soluble component of the typical or illustrative gas mixture, greatly preponderates in the solution, it is easily possible so to control the operation and the rate of outflow of the solution that the whole of the less soluble gases will be eliminated from the solvent together with a minor proportion only of the ethane. This is in principle the same purifying action which takes place in the rectification of a liquefied gas in a common rectification column: it differs from this, however, in that the action takes place in the presence of the same absorbing or solvent liquid which was used to collect the gas; and owing to the solvent properties of this liquid, the action takes place at a much higher temperature and a much lower pressure than would be the case if the only liquid present were one or more of the gas-components in liquid phase. The valuable technical effect obtained is that the less soluble methane is entirely removed from the solution, leaving the bulk of the ethane dissolved.

The gases thus eliminated in this rectification process contain a considerable proportion of ethane together with all of the eliminated impurities. They pass through the trays of the purifying column directly to the absorption tower, where the whole of the ethane, together with a minor proportion of methane, is re-absorbed and returned, the unabsorbed gases freed from ethane passing to the gas holder 11. The operation is so controlled that the solvent, charged with ethane, but free from less soluble gases, flows through the reducing valve 15 into the expansion chamber 16. At this point the pressure is reduced, preferably approximately to that of the atmosphere, and the ethane is rapidly evolved from the solution.

It will be noted that the arrangement of the purifying column is such that the last portions of the ethane to be evolved before leaving the column (such portions being therefore highest in purity) bubble through the whole of the solvent containing less pure ethane in solution, whereby the rectifying or "blowing out" effect of the gaseous ethane is utilized to the maximum extent.

An alternative but less desirable method of accomplishing this blowing out effect consists in introducing into the solution in the purifying tower ethane, either alone or containing some admixture of more soluble gases (propane, etc.), the ethane being supplied in sufficient volume to bubble through the solution and thereby to eliminate the methane. As a preliminary to this operation the pressure may be reduced or the temperature increased until the saturation point for ethane in the solution is reached or approximated, whereby the volume of gas required for the blowing out operation is greatly diminished.

The ethane evolved in the expansion tank 16 flows by pipes 17 and 19 to the gas holder 20. The kerosene or other solvent remaining in the expansion tank 16 contains at this stage residual dissolved ethane. In order to free it therefrom it may be delivered to a still 22 where a small portion of the liquid, together with the whole of the dissolved gas, may be fractionated off, the vapors passing to condenser 24 where any vaporized solvent is condensed and flows to the expansion tank 16; the ethane passing out to the gas holder 20. The purified solvent is conveyed to the storage tank 25 whence it may be returned by a pump 26 to the circulating system. For use with volatile solvents a condenser 18 is provided in the gas-exit system, the condensate being discharged into collecting vessel 21 and returned thence to the still 22.

As stated above my invention is not limited to the separation and recovery of ethane from natural gas, since it is equally applicable to the separation and recovery, from any mixture of gases, of any simple or complex component having a higher degree of solubility in the particular solvent chosen. Where several gases of relatively high solubility are present in a complex mixture with less soluble gases, they may be separated together, and later parted from each other by any appropriate fractionating or other method. Similarly, the invention may be applied in such a manner as to separate and recover components of a gas mixture in the order of their solubility in the same or different solvents. For example, in the case of natural gas, a mixture containing both ethane and gasoline vapor (principally butane, pentane, and hexane) may first be separated and recovered in the manner above described; and the resulting mixture may then be treated a second time in a similar process, with the same or other solvent, to obtain ethane substantially free from gasoline vapor and at the same time a commercial grade of gasoline free from ethane; the nature and rate of flow of the solvent, the temperature, pressure and other conditions being adjusted in each case with reference to the particular result to be obtained.

As a further operating example, the process may be applied to the separation and recovery of acetylene in a state of substantial purity from a gaseous mixture containing also hydrogen, ethylene, methane and other hydrocarbons,—for example such a gaseous mixture as is obtained by the electrothermic decomposition of liquid hydrocarbons in the manner disclosed in my prior U. S. Patent 1,315,540, patented September 9, 1919.

In such case acetone or other liquid having a high solvent power for acetylene is preferably employed, the general operation being substantially as hereinabove described. In this case the temperature of the solvent in the absorption system may advantageously be maintained at about —30° C., more or less, in conjunction with a gas pressure amounting to several atmospheres. Under these conditions the more soluble gas or gases, typified in this case by acetylene, are quickly absorbed; and by a proper adjustment as between the volumes and rates of flow of the solvent and the gas, an effluent gas mixture wholly free from acetylene is readily obtained. This is particularly important in the case of acetylene for the reason that even minute proportions of this gas may render unsafe the application to the effluent mixture of the known processes of fractional liquefaction. By operating in counterflow as described above, at low temperatures and at super-atmospheric pressures, it has been found applicable to reduce the acetylene content of the effluent gases to less than one part in one million.

In this case also the invention may be applied in such manner as to separate and recover several components in the order of their solubility in the same or different solvents. For example in the case of a mixture containing both acetylene and ethylene in conjunction with gases of relatively low solubility, the acetylene may first be separated and recovered in the manner above fully described, and the effluent acetylene-free gas mixture may then be treated in the same or similar apparatus for the separation and recovery of ethylene, the rate of flow of the solvent through the system being adjusted in each case with reference to the particular result to be attained. In the ethylene-recovery operation, the solvent employed will preferably be of the hydrocarbon type as explained above for ethane.

It will be readily understood by those skilled in this art that the operation may be variously modified without departing from the spirit of my invention. For example in the embodiments of the invention above described the pressure is maintained uniform throughout the absorbing and purifying or rectifying columns, while the temperature gradually rises as the solvent with its dissolved gases traverses the purifying column, the effect being to reduce progressively the solvent power of the liquid to a degree sufficient for the separation therefrom of the less soluble gases. A like result may be secured by a progressive reduction of the pressure through the purifying column by suitably located reducing valves or other devices; or if desired the temperature and pressure may be conjointly varied in the appropriate sense. It is necessary only in carrying this invention in its preferred embodiment into effect that provision be made for progressively reducing the solubility of the more soluble gas component in the solvent, after suitable absorption, in such manner and to such extent as to bring about the evolution of gas throughout the body of the solvent, whereby the rectifying effect of sweeping out completely in gaseous form the less soluble gas component or components is obtained, leaving a material proportion of the more soluble gas in the solvent in condition to be recovered in a substantially pure state. Furthermore, if the less soluble component is desired in a pure state for any purpose, the process described herein is of equal applicability for producing it in quantitative yield free from any more soluble component.

The present application is a continuation of my application Serial No. 302,040, filed June 5, 1919.

I claim:—

1. Process of separating and recovering a relatively soluble component from a gaseous mixture, comprising compressing the mixture; passing the compressed mixture in contact with a suitable solvent; withdrawing the gases from which the soluble component has been removed; withdrawing the solvent from the absorption system: progressively separating from the solvent by a rectifying action the less soluble gases; returning the gases thereby evolved to the absorption system; and separately recovering the soluble component from the solvent.

2. Process of separating and recovering a relatively soluble component from a gaseous mixture, comprising compressing the mixture; passing the compressed mixture in contact with a suitable solvent maintained at a temperature substantially below atmospheric; withdrawing the gases from which the soluble component has been removed; withdrawing the solvent from the absorption system; progressively separating from the solvent by a rectifying action the less soluble gases; returning the gases thereby evolved to the absorption system; and separately recovering the soluble component from the solvent.

3. Process of separating and recovering a relatively soluble component from a gaseous mixture, comprising compressing the mixture; passing the compressed mixture in contact with a suitable solvent maintained at a temperature substantially below atmospheric; withdrawing the gases from which the soluble component has been removed;

withdrawing the solvent from the absorption system; progressively reducing the solvent power of the liquid by raising the temperature thereof to separate the less soluble gases therefrom by a rectifying action; returning the gases thereby evolved to the absorption system; and separately recovering the soluble component from the solvent.

4. Process of separating and recovering a relatively soluble component from a gaseous mixture, comprising compressing the mixture; passing the compressed mixture in contact with a suitable solvent; withdrawing the gases from which the soluble component has been removed; blowing out less soluble gas from the solution by means of a more soluble component of the original mixture; returning the gases thereby evolved to the absorption system; and separately recovering the soluble component from the solvent.

5. Process of separating and recovering a relatively soluble component from a gaseous mixture, comprising compressing the mixture; passing the compressed mixture in contact with a suitable solvent maintained at a temperature substantially below atmospheric; withdrawing the gases from which the soluble component has been removed; withdrawing the solvent from the absorption system; blowing out less soluble gas from the solution by means of a more soluble component of the original mixture; returning the gases thereby evolved to the absorption system; and separately recovering the soluble component from the solvent.

In testimony whereof, I affix my signature.

GEORGE O. CURME, Jr.